Oct. 8, 1968 R. L. HOWARD 3,404,849

TAPE RECORDER AND TAPE DECK ASSEMBLY THEREFOR

Filed May 13, 1966 3 Sheets-Sheet 1

INVENTOR
RONALD L. HOWARD
BY [signature]
ATTORNEY

TAPE RECORDER AND TAPE DECK ASSEMBLY THEREFOR

Filed May 13, 1966 3 Sheets-Sheet 2

INVENTOR
RONALD L. HOWARD
BY
ATTORNEY

TAPE RECORDER AND TAPE DECK ASSEMBLY THEREFOR

Filed May 13, 1966 3 Sheets-Sheet 3

INVENTOR
RONALD L. HOWARD
BY
[signature]
ATTORNEY

United States Patent Office 3,404,849

Patented Oct. 8, 1968

3,404,849

TAPE RECORDER AND TAPE DECK ASSEMBLY THEREFOR

Ronald Leslie Howard, Waddon, England, assignor to Vectron Electro-Physics Limited, a British company Filed May 13, 1966, Ser. No. 549,920
10 Claims. (Cl. 242—55.12)

ABSTRACT OF THE DISCLOSURE

The motor of a tape recorder deck provides two rotating circumferential paths of different diameters, the smaller diameter path being associated with forward drive mechanism to drive the tape for recording or playback, and the larger diameter path being associated with reverse drive mechanism for fast rewind.

Figure 1:
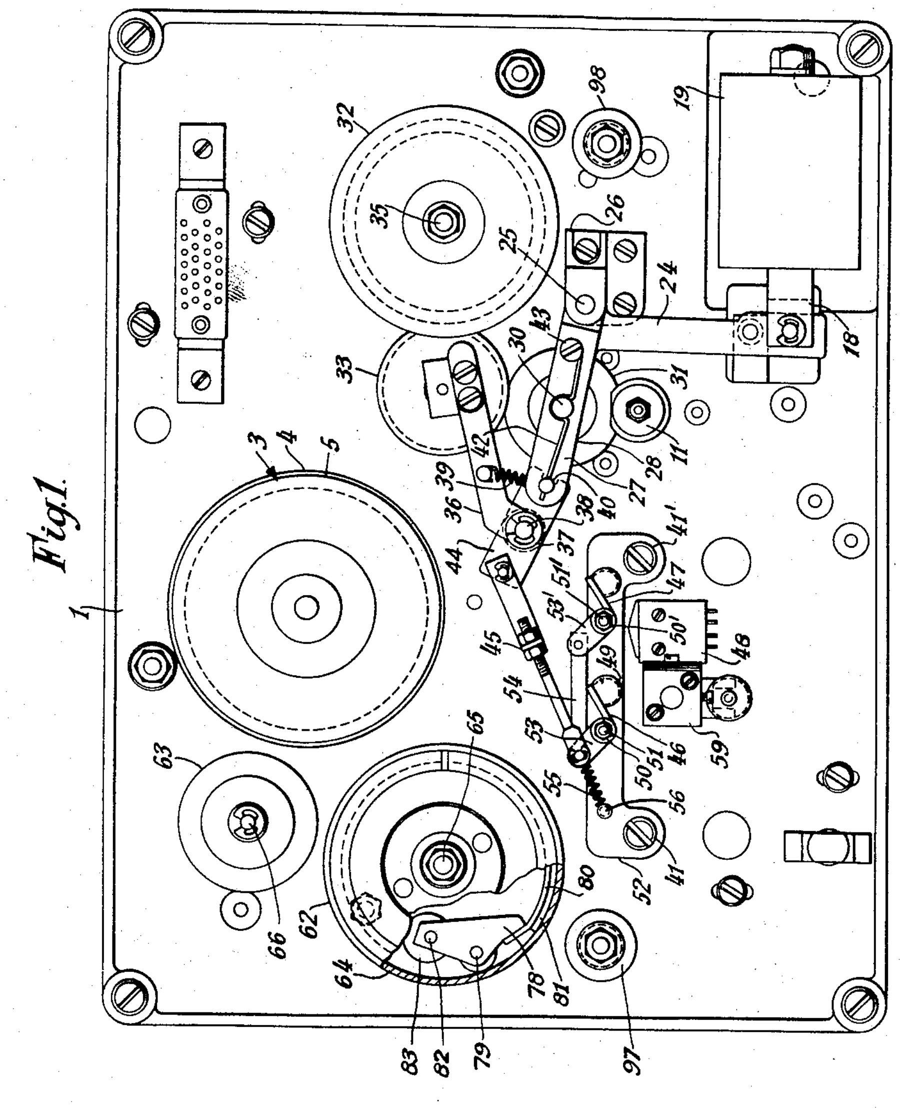

The present invention relates to a tape recorder deck and to a tape recorder employing such a deck.

A requirement arises in tape recorders to have one or more forward speeds for playback or recording and a reverse speed, which is very much faster than the fastest forward speed, for rewinding the tape.

It is an object of the invention to provide a tape recorder deck meeting this requirement but having the advantageous feature of being of a mechanically simple and reliable construction.

The invention is based on the idea of using as the synchronous motor of the tape recorder, one of the kind having a fixed armature and rotating cage. An advantage of using such motor is that the cage of the motor acts as a flywheel and makes it possible to take the reverse drive from the rotating part of the motor itself. Further, both drives may be taken from the rotating part of the motor without complex intermediate gearing between the motor and the driven parts in the tape deck to provide the widely differing speeds employed, respectively, in the forward and reverse drives of the tape since the rotating part of the motor may be constituted to provide circumferential paths of substantially different peripheral speeds, from which a drive can be taken. The motor, therefore, lends itself to the task of simplifying the tape deck construction.

There is provided by the present invention a tape deck providing in addition to a forward drive for recording on or playback of a tape, a reverse drive for a fast rewind of the tape wherein the reverse drive is taken from a rotating part, preferably the cage, of a synchronous electric motor of the kind in which the armature is fixed and the cage rotates.

In one embodiment of the tape deck of the invention, both the supply spool and the flywheel of the capstan are driven from different circumferential paths provided by the rotating part of the motor, through intermediate friction wheels. The takeup spool may be driven in a like manner or from the flywheel of the capstan but is preferably driven from a pinch roller according to the invention described and claimed in British Patent 908,279.

The provision of a fast rewind in certain applications of tape recorders is of particular importance. For instance, in a tape recorder employed as a "juke box" and using a multitrack tape with a tune recorded on each track, the number of tunes that can be played in any given time depends not only on the playing time of each track but also on the time taken to rewind the tape after each playing since the tape must be rewound after each track is played to enable a further playing to be made. Like conditions exist when such a tape recorder is used to provide information on request in answer to enquiries, for example, at an hotel enquiry desk. In this case each track contains some information of interest to the probable enquirer and again since the tape must be rewound after a track is played, it is important to wind the tape back as quickly as possible.

A tape deck in accordance with the invention is, therefore, particularly well adapted for use in such tape recorders since it not only provides a fast rewind but because of its simplicity, ensures reliable operation in spite of long and repeated use.

Accordingly, in another embodiment a multi-channel tape recorder is provided employing a tape deck in accordance with the invention.

Figure 2:
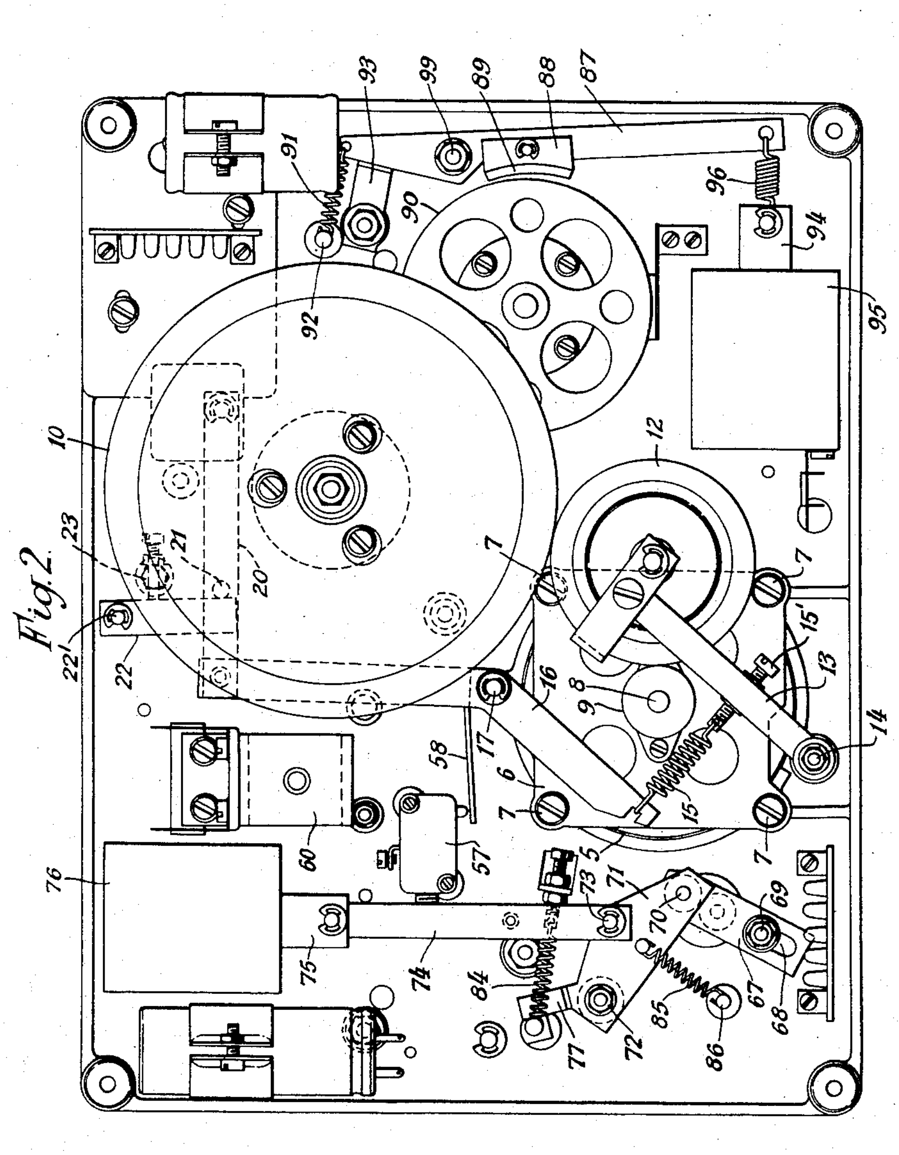
Figure 3:
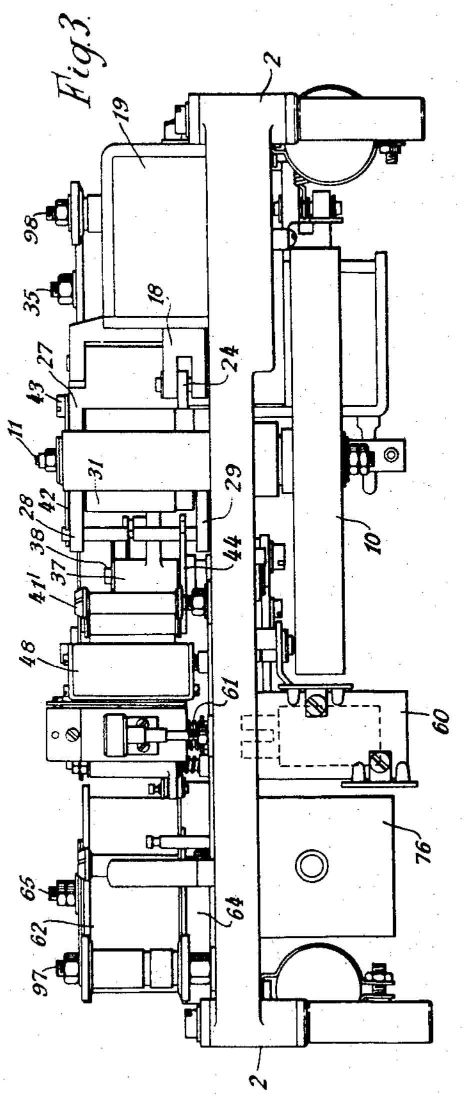
Figure 4:
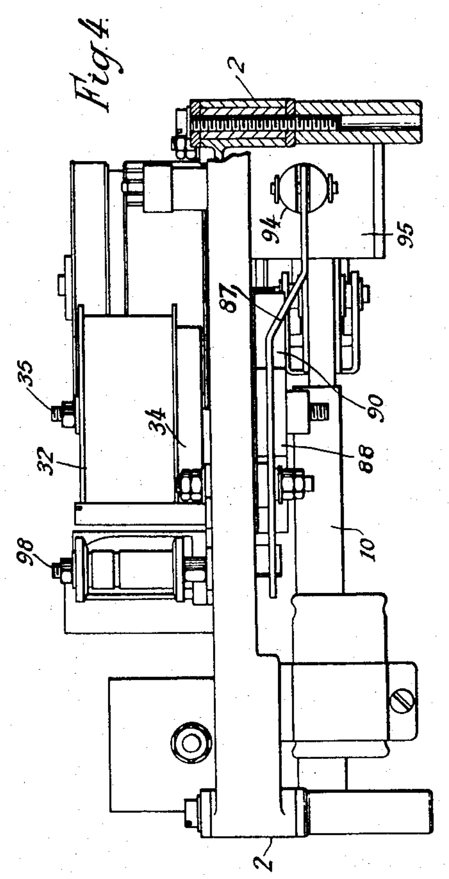

A tape deck according to the invention will now be described, by way of example only, with reference to the accompanying drawings in which:

FIGURE 1 is a plan view from above of the tape deck;
FIGURE 2 is a plan view from below of the tape deck;
FIGURE 3 is a front elevation of the tape deck; and
FIGURE 4 is a side elevation elevation of the tape deck as taken from the right hand side of FIGURE 1:

Referring to the drawings it may be seen that the tape deck comprises a base plate 1 of rectangular shape mounted on four leg assemblies 2, one at each corner of the plate. The base plate has mounted thereon, or on a member carried by the base plate, a takeup spool spindle, a supply spool spindle, brakes for these spindles, a capstan carrying a flywheel, a pinch roller, a 16-channel transducer head for recording, playback or erasing, forward drive mechanisms for the flywheel of the capstan and takeup spool and a reverse drive mechanism for the supply spool, solenoids and other control-circuit elements and a synchronous electric motor. The electric motor generally indicated at 3 is a 50 c./s. squirrel cage Papst motor of the designation KLM20 and is one of the type having a fixed armature and a rotating cage provided with the central spindle rotating with the cage. It will be understood from this that the armature is in the form of a ring which lies within an inverted annular well formed by the cage. For the purpose of mounting the motor, the base plate 1 contains a circular aperture 4 of a slightly larger diameter than that of the motor cage 5, and a rectangular mounting plate 6 for the motor located below the aperture 4 and secured to the base plate 1 by four screws 7, one at each corner of the mounting plate, passed through bores in the mounting plate from below upwards to be received in tapped bores in the base plate 1. The mounting plate 6 has the armature (not shown) secured thereto and is located to carry the motor so that the motor cage 5 extends through the aperture 4 to stand proud of the base plate 1, and the mounting plate 6 is also provided with a central vertical bearing (not visible) for the spindle 8 of the motor which passes down through the bearing to extend below the mounting plate 6 and carry thereat a boss 9 fast with the spindle 8.

The drive to the flywheel 10 of the capstan 11 is taken from the boss 9 through an intermediate friction wheel 12. The friction wheel is mounted on an arm 13 depending from the underside of the base plate 1 by a pivot pin 14 and is kept permanently in engagement with the boss 9 and the flywheel 10 by a tension spring 15 one end of which is secured to the arm 13 by means of a tension-adjusting screw 15' and the other end of which is secured to one end of a bell-crank lever 16 pivoted at the crank to the underside of the base plate 1 by a pivot pin 17. The other end of the lever 16 is connected to the armature 18 of a solenoid 19 by a link rod 20. The link rod 20 carries a stop member 21 which acts as a stop against an arm 22 pivoted to the underside of the base plate 1 by a pin 22' and held against the stop by the action of a tension spring 23. The purpose of this stop mechanism will be explained below. Also connected to the armature 18 is a further cranked lever 24 pivoted on the upper surface of the base plate 1 by a pin 25 which is carried by a post 26 anchored to the base plate 1. The lever 24 provides in the arm 23 of the lever remote from the solenoid 19 two vertically aligned and spaced apart fingers 28, 29, each bored at the midpoint to act as a mounting for a shaft 30 about which the pinch roller 31 freely rotates. The drive to the takeup spool 32 is taken from the pinch roller 31 through an intermediate friction wheel 33 which when the drive is operative bears against the pinch roller and a friction drum 34 mounted on the spindle 35 of the takeup spool 32. The wheel 33 is mounted on one end of an arm 36 the other end of which is pivotally mounted by an integral sleeve 37 on a post 38 anchored to the base plate 1 and the arm 36 is biassed towards the cranked lever 24 by a tension spring 39 secured at one end to the arm 36 and at the other to a vertical pin 40 mounted in the fingers 28, 29 near the extremities thereof. The pin 40 passes through the upper finger 29 and carries a transverse through-bore forming an eye in the portion above the finger 29 and is located together with the shaft 30 for the pinch roller by a spring wire 42 which intermediate its ends is looped partly around the shaft 30 and which at one end is received in the eye of the pin 40 and at the other is secured by a screw 43 received in a tapped bore in the lever 24. The post 38 also has pivotally mounted thereon beneath the sleeve 37 a lever 44 so that the lever 44 can pivot around the post 38 independently of the sleeve 37. The lever 44 is notched at one end to engage with the pin 40 of the cranked lever 24 and is connected at the other end to an actuating rod 45 for two swinging arms 46, 47 which serve to bring the tape into correct alignment and to engage the tape with the transducer head 48. Each arm comprises a tape-engaging rod 49, 49′ and an integral sleeve 50, 50′ by means of which each arm is pivotally mounted on a post 51, 51′ secured to a base member 52 supported on the base plate 1 and carrying two tape guide posts 41, 41′. Each of the sleeves 50, 50′ carries a lug 53, 53′ connected to each other by a link rod 54 so that the two arms 46, 47 move together. The lug 53 is biassed by a tension spring 55 connected at one end to the lug and secured at the other end by a screw 56 received in a tapped bore in the base member 52 to urge the arms 46, 47 out of engagement with the tape. The lug 53 is also pivotally connected to the end of the actuating rod 45 remote from the lever 44 so that movement of the rod 45 in a direction away from the arms 46, 47 swings the arms into engagement with the tape against the spring bias and so that when the actuating rod 45 is released, the spring 55 swings the arms to a position in which they disengage the tape.

On activation of the solenoid 19 the lever 24 is pivoted to bring the pinch roller and the arms 46, 47 into engagement with the tape and simultaneously move the link rod 20 from left to right as seen in FIGURE 2 which causes the wheel 12 to be urged more into engagement with the boss 9 and the flywheel 10 of the capstan. This movement also causes a microswitch 57, seen in FIGURE 2, to be reset for a purpose hereinbelow described, by engagement with an arm 58 carried by the bell-crank lever 16. On deactivation of the solenoid 19 the reverse movements are effected with the travel of the link rod 20 being limited by the stop 21 acting against the tension spring 23 through the arm 22. The tension in the spring 23 is such that when it stops the shift of the link rod 20 it is not fully extended and this permits the pinch roller to be moved manually further in the direction of disengagement to make the tape more accessible by allowing further movement of the link rod 20 against the spring 23.

The transducer 48, as mentioned, has 16 channels and is mounted on the vertical armature 59 of a solenoid 60, biassed upwardly by a compression spring 61 carried on the armature 59 so that with the solenoid 60 deactivated, the head 48 assumes one position in which it covers 16 tracks on a tape and with the solenoid activated, a second position in which the head covers 16 different tracks on the same tape. By this means, the head can be used to record, playback or erase on 32 tracks.

The reverse drive to the supply spool 62 is taken from the cage of the motor through an intermediate friction wheel which when the drive is operative bears against the cage of the motor and a friction drum 64 mounted on the supply spool spindle 65. The wheel 63 is mounted above the base plate 1 on an axle 66 which passes through a slot (not shown) in the base plate 1 to be carried thereunder by an arm 67; the axle 65 being mounted near one end of the arm 67 which towards the other end is slotted at 68 and pivotally mounted on a pin 69 passing through the slot and depending from the underside of the base plate 1. The arm 67 at the end remote from the slot is pivotally linked by a pin 70 to a lever 71 and the lever 71 is pivoted to the underside of the base plate 1 by a pin 72, and by a pin 73 to one end of an actuating rod 74 the other end of which is secured to the armature 75 of a solenoid 76. The lever 71 also carries an arm 77 which constitutes an actuating member for a brake provided for the supply spool spindle. The brake consists of a cranked lever 78 pivoted at the crank by a pin 79 on the upper surface of the base plate 1 and carrying a brake pad 80 to act against the inner circumferential wall 81 of the friction drum 64. The end of the lever 78 remote from the pad 80 carries a pin 82 which projects through an aperture 83 in the base plate 1 to extend therebelow to contact an edge of the lever 71. The pin 82 is biassed so as to keep the brake pad 80 lightly in engagement with the wall 81 by a tension spring 84 carried at one end by the pin 82 and anchored at the other to the underside of the base plate 1 by an adjustable screw; movement of the pin 82 in the direction of the bias being limited by contact with the lever 71 as above described. The lever 71 is itself biassed to pivot away from the armature 75 by a tension spring 85 secured at its ends respectively to the lever 71 and to a pin 86 depending from the underside of the base plate 1. When the solenoid 76 is activated, the lever 71 is pivoted towards the armature 75. In so doing it simultaneously brings the wheel 63 into engagement with the motor cage and the friction drum 64, and displaces the pin 82 against the spring bias to cause the cranked lever 78 to pivot and remove the brake pad 80 from contact with the circumferential wall 81 of the friction drum 64; and when the solenoid is deactivated the reverse movement takes place to restore the brake and disengage the reverse drive.

The takeup spool is also provided with a brake which consists of a level 87 providing a brake shoe 88 carrying a brake pad 89 to act against a brake drum 90 carried below the base plate by the takeup spool spindle which extends below the base plate for this purpose. The lever 87 is pivoted just forward of the brake shoe 88 by a pin 99 depending from the underside of the base plate 1 and is biassed normally to maintain the brake out of engagement by a tension spring 91 secured at one end to the lever 87 near one extremity thereof and at the other end to a pin 92 depending from the underside of the base plate 1. The movement of the lever 87 in the direction of the spring bias is limited by a stop 93 secured to the underside of the base plate 1. At the other extremity the lever 87 is resiliently linked to the armature 94 of a solenoid 95 by a normally untensioned spring 96 secured at one end to lever 87 and at the other to the armature 94 so as to allow of a greater movement of the armature 94 than of the brake lever 87. The brake for the takeup spool is applied only momentarily when the pinch roller is disengaged from the tape. The solenoid 95 for the brake contains in its circuitry the microswitch 57 which is disengaged by the arm 58 almost immediately after deactivation of the solenoid 19 and disengagement of the microswitch 57 deactivates the brake solenoid 95. A further microswitch may be provided to be actuated by the arm 58 so that, except when the tape is being played, the output of the recorder is muted to diminish any noise arising from rewinding the tape.

Two further switches are provided on the tape deck each in the form of circuit terminals (not shown) mounted respectively on tape guide posts 97, 98 secured to the base plate 1. These switches are intended for use with a tape provided with contacts to bridge the terminals of each of the two switches so that when the tape has been played, a contact on the tape bridges the terminals of the right hand post 98, viewed in FIGURE 1, automatically to deactivate solenoid 19, activate solenoid 95 to apply the takeup spool brake and activate solenoid 76 to rewind the tape by bringing the wheel 63 into engagement with the friction surface 64 of the supply spool and the cage of the motor as above described, and simultaneously releasing the supply spool brake. After the correct amount of tape has been rewound a further contact on the tape bridges the terminals on the left hand post 97 as viewed in FIGURE 1 to deactivate solenoid 76 and reapply the supply spool brake and thereby bring the supply spool to rest. The tape is then at rest and ready to be replayed (or to have a recording made therefrom). It will be understood that the tape in use is not wound completely off a spool but remains permanently attached to both the spools.

The tape deck as above described is particularly intended for use in a recorder employing a 32-track tape and the recorder is provided with appropriate electrical circuitry for selecting any one track to be played and for otherwise operating the recorder. Since this electrical circuitry is not per se part of the invention and since it is within the competence of a skilled person to provide such circuitry, it will not be further described except for the purpose of explaining its effect. In employing such a recorder with the tape deck as above described, assuming the motor is running and the tape rewound, the solenoid 19 is actuated to engage the pinch roller and the swinging arms 46, 47 with the tape and simultaneously shift the link rod 20 from left to right as viewed in FIGURE 2 to react the microswitch 57 (or microswitches) and tighten the tension in the spring 15 to urge the wheel 12 more into engagement with the boss 9 and the flywheel 10 of the capstan 11. Engagement of the pinch roller with the tape causes the arm 36 to be pivoted under the influence of the spring 39 to bring the wheel 33 into engagement with the pinch roller and the friction drum 34 of the takeup spool and thereby transmit drive to the takeup spool. When the selected track has been played, the switch on the post 98 causes the tape to be rewound as described above to enable a further selection to be made. The motor, after rewinding of the tape is completed, still remains in operation and to prevent its running continuously, when the recorder is not being used circuitry may be provided to switch off the motor within say eight seconds of completion of rewinding of the tape unless a further selection is made during this time. The output of the recorder may be taken through a telephone handset the cradle of which acts as a switch automatically to cause the tape to be rewound if the handpiece is replaced on the cradle before the selected track has been fully played. Selection of the tracks may be provided by 32 pushbutton switches, one for each of the tracks and circuitry is provided to ensure correct positioning of the transducer head by activation or deactivation of solenoid on any selection.

It will be understood that the present invention is not limited to using frictional drives through wheels or rollers as above described and that the drives could be provided by belts or spring-wire bands driven by the motor or by other rotating parts and that likewise more than one forward speed may be provided by the use of suitable gearing.

The tape deck of the invention and a recorder employing such deck may be used in the tape recorder system described and claimed in the complete specification of copending application No. 36,959/64.

What I claim is:

1. A tape recorder deck adapted to receive, as the source of motive power, a synchronous electric motor of the kind in which the armature is fixed and the cage rotates and in which the motor provides two rotating circumferential paths of different diameters, the deck comprising two spindles to receive spools respectively for taking up tape and for supplying tape so that tape may be wound from one spool to the other for any of the operations of playback, recording and rewind; a forward drive means comprising means for taking drive from the circumferential path of said motor of lesser diameter whereby the tape is driven at a speed for recording or playback and a reverse drive means comprising means for taking drive from the circumferential path of said motor of larger diameter whereby tape is driven in the reverse direction to the direction of forward drive and at a speed which is substantially greater than the speed of forward drive.

2. A tape recorder deck adapted to receive, as the source of motive power, a synchronous electric motor of the kind in which the armature is fixed and the cage rotates and in which the motor provides two rotating circumferential paths of different diameters, the deck comprising two spindles to receive spools respectively for taking up tape and for supplying tape so that tape may be wound from one spool to the other for any of the operations of playback, recording and rewind; a forward drive means whereby the tape is driven at a speed for recording or playback comprising a capstan to apply drive to the tape to drive it from one spool to the other, a flywheel carrying said capstan so that rotation of the flywheel rotates the capstan, means for transmitting drive from the circumferential path of smaller diameter to the capstan flywheel, and means for transmitting drive from said path of smaller diameter to the spindle of the spool for taking up tape driven by the capstan; and a reverse drive means comprising a cylindrical friction surface mounted concentrically with the spindle of the supply spool and an intermediate roller mounted to be moveable to engage the circumferential path of larger diameter and said friction surface to transmit drive from the motor to said surface to rotate the spindle of the supply spool whereby the tape is driven in the reverse direction to the direction of forward drive and at a speed which is substantially greater than the speed of forward drive.

3. A tape recorder deck as set forth in claim 2 wherein said capstan, said capstan flywheel and said means for transmitting drive thereto also constitute part of said means for transmitting drive to the takeup spool and said latter means further comprise a pinch roller mounted to be moveable between an operative position in which it is engaged with the tape to force it against the capstan and an inoperative position, a cylindrical friction surface mounted concentrically with the spindle of the takeup spool and an intermediate roller mounted to be moveable from an inoperative position to an operative position in which when the pinch roller is in its operative position, the intermediate roller transmits drive from the pinch roller to the cylindrical friction surface thereby to rotate the spindle of the takeup spool.

4. A tape recorder deck as set forth in claim 2 wherein said friction surface of the supply spool spindle is constituted by the external circumferential surface of a drum and wherein said drum carries therewith a brake shoe on a brake arm which is resiliently biassed normally to urge the brake shoe lightly against the inner surface of the circumferential wall of the drum, and means are provided for operating said intermediate roller so that when the latter is moved into contact with the said path of larger diameter of the motor and said friction surface, the brake arm is moved against the resilient bias to release the brake.

5. A tape recorder deck as set forth in claim 2 wherein said means for transmitting drive to the capstan flywheel comprise an intermediate roller mounted resiliently biassed so that it is normally urged into contact with the capstan flywheel and said path of the motor of lesser diameter, to maintain rotation of the capstan for as long as the motor is in operation.

6. A tape recorder deck as set forth in claim 2 wherein said means for transmitting drive to the capstan flywheel comprises an intermediate roller mounted resiliently biassed so that it is normally urged into contact with the capstan flywheel and said path of the motor of lesser diameter, to maintain rotation of the capstan for as long as the motor is in operation and wherein means are provided for increasing the bias exerted on the intermediate roller in order to prevent slipping thereof against either the capstan flywheel or the rotating part of the motor when the pinch roller engages the tape to force it against the capstan and the capstan takes up the load of driving the tape.

7. A tape recorder deck adapted to receive, as the source of motive power, a synchronous electric motor of the kind in which the armature is fixed and the cage rotates, the deck comprising two spindles to receive spools respectively for taking up tape and for supplying tape so that tape may be wound from one spool to the other for any of the operations of playback, recording and rewind; a forward drive means whereby the tape is driven at a speed for recording or playback comprising a capstan to apply drive to the tape to drive it from one spool to the other, a flywheel carrying said capstan so that rotation of the flywheel rotates the capstan, means for transmitting drive from said motor to the capstan flywheel to rotate the latter, a pinch roller mounted to be moveable between an operative position in which it is engaged with the tape to force it against the capstan, and an inoperative position, a friction drum mounted concentrically with the spindle of the takeup spool, an intermediate roller mounted to be moveable from an inoperative position to an operative position in which, when the pinch roller is in its operative position, the intermediate roller transmits drive from the pinch roller to the external circumferential surface of the drum thereby to rotate the spindle of the takeup spool; means to engage the intermediate roller with the pinch roller and the friction drum of the takeup spool spindle on movement of the pinch roller to engage the tape with the capstan, and to disengage the intermediate roller from the pinch roller and said friction drum on the reverse movement of the pinch roller.

8. A tape recorder deck as set forth in claim 7 wherein a stop is provided to limit movement of the pinch roller away from the capstan when the pinch roller is disengaged from the tape; the stop being mounted with a resilient bias so that the pinch roller assumes one position after disengagement with the tape and can be moved manually against the resilient bias of the stop from said one position further away from the capstan.

9. A tape recorder deck as set forth in claim 7 wherein the spindle of the takeup spool is provided with a brake drum and wherein a brake is provided together with means for operating the brake such that the brake is momentarily applied to brake the drum when the forward drive is disengaged.

10. A tape recorder deck as set forth in claim 7 wherein the spindle of the takeup spool is provided with a brake drum and wherein a brake is provided together with means for operating the brake such that the brake is momentarily applied to brake the drum when the forward drive is disengaged; said brake operating means comprising a solenoid movement of the armature of which operates the brake, an electrical circuit for energising the solenoid, a microswitch, as a component of said circuit, the opening of which microswitch when the solenoid is activated, causes deactivation of the solenoid; and wherein means are provided for operating said pinch roller, said means being such as also to cause activation of the solenoid immediately on disengagement of the pinch roller from the tape, and comprising an arm to actuate the microswitch so that the microswitch is kept closed for a period following disengagement of the pinch roller from the tape sufficient to allow of said application of the brake to the brake drum of the takeup spool spindle.

References Cited

UNITED STATES PATENTS

| | | | |
|---|---|---|---|
| 2,645,495 | 7/1953 | Nelson | 274—4 |
| 3,041,000 | 6/1962 | Springer | 242—55.12 |

LEONARD D. CHRISTIAN, *Primary Examiner.*